United States Patent
Lanzatella et al.

(10) Patent No.: US 7,165,057 B2
(45) Date of Patent: Jan. 16, 2007

(54) METHODS AND SYSTEMS TO ACCESS STORAGE OBJECTS

(75) Inventors: Thomas W. Lanzatella, Minneapolis, MN (US); Graham Bromley, Dublin, CA (US); John A. Colgrove, Los Altos, CA (US); Ron Karr, Palo Alto, CA (US); Blaine T. Cuykendall, San Jose, CA (US); Oleg Kiselev, Palo Alto, CA (US); Craig Harmer, San Francisco, CA (US); Allen Unueco, Bellevue, WA (US); Steven Michael Umbehocker, Mercer Island, WA (US)

(73) Assignee: Veritas Operating Corporation, Cupertino, CA (US)

( * ) Notice: Subject to any disclaimer, the term of this patent is extended or adjusted under 35 U.S.C. 154(b) by 408 days.

(21) Appl. No.: 09/997,350

(22) Filed: Nov. 29, 2001

(65) Prior Publication Data

US 2003/0101186 A1 May 29, 2003

(51) Int. Cl.
*G06F 17/30* (2006.01)

(52) U.S. Cl. .......................... 707/1; 711/103; 711/117; 711/118

(58) Field of Classification Search ................ 711/202, 711/132, 103, 117, 118; 707/1–10; 717/117, 717/202
See application file for complete search history.

(56) References Cited

U.S. PATENT DOCUMENTS

| | | | |
|---|---|---|---|
| 5,991,542 A | 11/1999 | Han et al. ..................... 717/176 |
| 6,029,168 A | 2/2000 | Frey .............................. 707/10 |
| 6,101,169 A * | 8/2000 | Fahey .......................... 370/246 |
| 6,128,717 A * | 10/2000 | Harrison et al. ............. 711/202 |
| 6,141,686 A * | 10/2000 | Jackowski et al. .......... 709/224 |
| 6,564,219 B1 * | 5/2003 | Lee et al. .................... 707/100 |
| 6,687,760 B1 * | 2/2004 | Bracha ......................... 719/310 |
| 6,728,963 B1 * | 4/2004 | Forin et al. .................. 719/310 |
| 6,874,123 B1 * | 3/2005 | DeStefano ................... 715/526 |
| 6,874,146 B1 * | 3/2005 | Iyengar ........................ 719/313 |
| 2002/0120741 A1 * | 8/2002 | Webb et al. ................. 709/225 |
| 2002/0169556 A1 * | 11/2002 | Sokolov et al. ................ 702/1 |
| 2005/0041459 A1 * | 2/2005 | McDonald ................... 365/154 |

OTHER PUBLICATIONS

"Storage Area Networking—High-Speed Data Sharing Among Multiple Computer Platforms", *Tivoli Systems, Inc., Copyright 2000*, http://www.tivoli.com/products/documents/whitepapers/san_datasharing_wp.pdf, (2000),4 pages.

(Continued)

*Primary Examiner*—Don Wong
*Assistant Examiner*—Hanh Thai
(74) *Attorney, Agent, or Firm*—Meyertons Hood Kivlin Kowert & Goetzel, P.C.; Rory D. Rankin; B. Noël Kivlin

(57) ABSTRACT

Methods and systems to access storage objects are provided. A reference to a storage object is used to determine a storage stack level associated with the reference. If the storage stack level is not the lowest level of a storage stack, then the reference is translated to a next stack level reference and passed through to a next stack level associated with the stack. References are translated and passed through iteratively until the lowest level of the stack is reached, wherein an absolute reference to the storage object is obtained and propagated back to an original referencing module, thereby providing access to the storage object.

15 Claims, 5 Drawing Sheets

OTHER PUBLICATIONS

"Storage Management—Best Practices", *Copyright 2001, IBM Corp.*, http://www.tivoli.com/products/documents/whitepapers/wp-storage-bp.pdf,(2001), 11 pages.

Amiri, Khalil.S. ,"Scalable and manageable storage systems", *Ph.D. Thesis, Dept. of Electrical and Computer Engineering, Carnegie Mellon University, Pittsburgh, PA*, http://www.pdl.cmu.edu/PDL-FTP/NASD/amiri_thesis.pdf,(Dec. 2000),i-241.

Wylie, Jay.J. ,et al. ,"Selecting the Right Data Distribution Scheme for a Survivable Storage System", *Research Paper, School of Computer Science, Carnegie Mellon University, Pittsburgh, PA*, http://www.pdl.cmu.edu/PDL-FTP/Storage/CMU-CS-01-120.pdf,(May 2001),pp. 1-21.

* cited by examiner

METHODS AND SYSTEMS TO ACCESS STORAGE OBJECTS

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software descriptions/examples, and data as described below and in the drawings hereto: Copyright© 2001, VERITAS Software Company., All Rights Reserved.

FIELD OF THE INVENTION

The present invention is related to accessing storage objects, and more particularly to methods and systems provide access to storage objects by traversing and interfacing with a storage management stack associated with the storage objects.

BACKGROUND INFORMATION

Storage networking is the practice of connecting storage devices to computing devices (e.g., clients, servers, and the like) by using Fibre Channel networks instead of traditional point-to-point small computer system interface (SCSI) channels. A network used to connect servers to storage devices is referred to as a storage area network (SAN). Within a SAN environment, all computing devices have access to the available storage devices. This presents a wide variety of benefits, including server platform fail-over wherein a failed storage device is automatically recovered by another operational server platform without requiring any recabling of the storage devices themselves. As will be apparent to those skilled in the art, connectivity among the computing devices and the underlying storage devices within the SAN environment is shared.

Prior to the development of SAN technology, local and wide area networks provided connectivity between computing devices that did not include storage devices. Connections were established with network protocols such as Transmission Communication Protocol (TCP), Unreliable Datagram Protocol (UDP), and others. These protocols ensure that message ordering is preserved and that messages are not lost. Distributed File Systems such as network file system (NFS) and Common Internet file system (CIFS) are layered on top of network protocols. Distributed File Systems organize access to files and correspondingly data storage elements across a network consisting of heterogeneous computing devices. The computing devices are typically organized as clients and servers, in a client-server architecture. Access to files or data storage elements is transparent to any particular computing device, such that access is consistent across the distributed file system without the need to have any private information about the physical locations or details associated with any particular file or data element.

The convenience of distributed file systems comes with an expense, since every byte of data exported by a file server managing a distributed file system must pass through the file server's memory, through the communications stack, and through a network interface controller before it reaches the application. Accordingly, the low performance and low throughput of operation associated with distributed file systems prohibit the implementation of many high performance data-sharing applications such as large scale distributed database applications, backup applications and the like. SAN environments present the opportunity to alleviate this issue by elevating storage devices within the network to peers of the clients and the servers, thereby in theory providing the opportunity for improving throughput of operation.

Yet, SAN technology has not produced advances in throughput of operations as one would anticipate. This is due to the fact that shared access to data among several compute platforms must be mediated by distributed file systems. Consequently, while the speed of connections between platforms has scaled upward with the introduction of SAN, the basic method of using distributed file systems to share data has not changed. Distributed file systems are innately restricted in the level of performance that can be achieved due to the computing overhead introduced by the communication protocol. Consequently, application writers are motivated to find strategies other than distributed file system in order to share data at speeds that are consistent with SAN technology. These strategies typically employ sharing information about files and volumes with remote application components. Using this information, an application can know everything about a file without having access to the file through a distributed file system. Additionally, the application can use this information to reference data directly on the SAN-connected storage device.

For these strategies to succeed, applications need to be able to discover sufficient information about files and volumes that a component on another platform can access the data associated with the file or volume. Customarily, this type of information is not externalized by either file systems or distributed file systems. As used herein this is referred to as private information. Private information differs from one file system operating on one computing device within the SAN and another file system operating on another computing device within the SAN. Correspondingly, data storage element portability is difficult to achieve within the confines of present SAN technology.

Furthermore, the very purpose of file system and volume manager function within an operating system is to hide the private information related to data storage elements located on one or more data storage devices. Accordingly, operating system vendors, file system vendors or volume manager vendors do not reveal or provide any useful interfaces that provide access to private information. Moreover, storage environment software stacks are complex and trying to extract the private information from existing stacks is not readily achievable without intervention from the file system software or volume manager software itself.

Moreover private information about data storage elements is in a continual state of flux in modern data storage architectures, since at any moment in time data storage elements are moved during storage device failure, device reorganization to reduce fragmentation, and the like. Therefore, any ability to acquire private information must also entail notification that private data has been changed. Otherwise, the acquired private information may be stale or inaccurate.

In addition to performance bottlenecks, many disparate operating systems housing particular file systems can not seamlessly interact with one another since the private information about data storage elements remains largely unobtainable to application software programs. Therefore, when an organization migrates from one operating system, file system or volume manager to a different operating system, file system or volume manager an expensive data storage migration also ensues.

In an effort to address some of these problems some industry associations have been initiated in an attempt to standardize data storage device communication. For example, the Storage Network Industry Association (SNIA) and the National Committee for Information Technology Standards (NCITS) technical committee T11 have been established. Yet, these associations are attempting to gain voluntary standardization for storage device manufacturers to adhere to when developing storage devices, and therefore the work of these associations will not assist with existing storage devices, existing operating systems, existing file systems or existing volume managers. Accordingly, the success of these associations is limited in scope and has yet to be demonstrated even with newly released products and services.

Additionally, even with persistent and stable representations of data storage elements, workable and useable application programming interfaces (APIs) will need to be established, such that different levels of abstraction and interfacing to the storage elements can be achieved seamlessly with user-defined software applications. In this way, user-defined software applications can utilize the APIs to better interact with the storage objects. Moreover, the user-defined software applications will often reside in storage environments different from the storage elements, therefore any provided API must be capable of operating in both storage environments.

Furthermore, each different storage environment can represent a storage element using a variety of different storage configurations. In fact, the underlying operation system and file system associated with a particular storage environment often require the execution of an ordered sequence of operations before access to a storage element is granted within the storage environment. Correspondingly, even with information about the storage environment of a particular storage element, additional information regarding the storage environment's operating system and file system are needed before proper access to the storage element is obtained.

Moreover, user-defined applications are implemented at different levels of abstraction and thus a user-defined application can make reference to a storage element at different abstraction levels within the storage environment. As a result, any provided API must be capable of determining the storage element's reference level within the storage environment. Therefore, access to the private information or absolute location of the storage element presents a number of challenges when providing APIs to user-defined software applications.

Therefore, what is needed are methods and systems for providing access to data storage elements residing in any storage environment, regardless of any reference level within which access is attempted on the storage element, thereby resulting in access to data storage elements becoming more seamless, transparent, flexible, and reliable across storage environments.

SUMMARY OF THE INVENTION

According to one aspect of the present invention, a method for resolving a storage object's absolute location within a first storage environment to grant access to the storage object is provided, wherein a storage object reference is received. Subsequently, an initial stack level associated with the storage reference is determined and one or more descendent stack levels are queried beginning with the initial stack level. Moreover, the storage reference is translated with each iteration into one or more relative extents until one or more absolute extents are obtained, wherein the one or more absolute extents comprise the storage object's absolute location within the first storage environment.

According to another aspect of the present invention, a method of providing access to a storage object is provided, wherein a request to access the storage object is received from a client module in a first storage environment. Further, one or more mapping plug-in modules are initiated in a second storage environment and the mapping plug-in modules are used to determine a storage hierarchy of the second storage environment. Next, the storage hierarchy is iterated through using one or more of the mapping plug-in modules until one or more absolute storage locations associated with the storage object are determined.

According to still another aspect of the present invention, a storage object access system is provided. The system includes an application programming interface (API) library having one or more client-accessible modules operable to allow a reference to a storage object in a first storage environment. The system further includes one or more plug-in modules operable to interface with the client-accessible modules in a second storage environment using the reference and granting access to the storage object to one or more of the client-accessible modules in the first storage environment. Moreover, the system has a client module that establishes an interaction with the storage object from the first storage environment using one or more of the client-accessible modules.

In yet another aspect of the present invention, a storage object access system is provided. The system includes a storage management stack having a plurality of stack levels, wherein the stack levels include a lowest level identifying one or more storage devices of a first storage environment. Also, the system has one or more plug-in modules wherein each plug-in module interfaces with one of the stack levels to resolve a reference to a storage object and to pass the resolved reference to a next stack level, unless the resolved reference is an absolute reference to the storage object housed on one or more of the storage devices. Additionally, the system includes a controller that selectively calls a number of the plug-in modules until the absolute reference is obtained.

DESCRIPTION OF THE PREFERRED EMBODIMENTS

Figure 1:
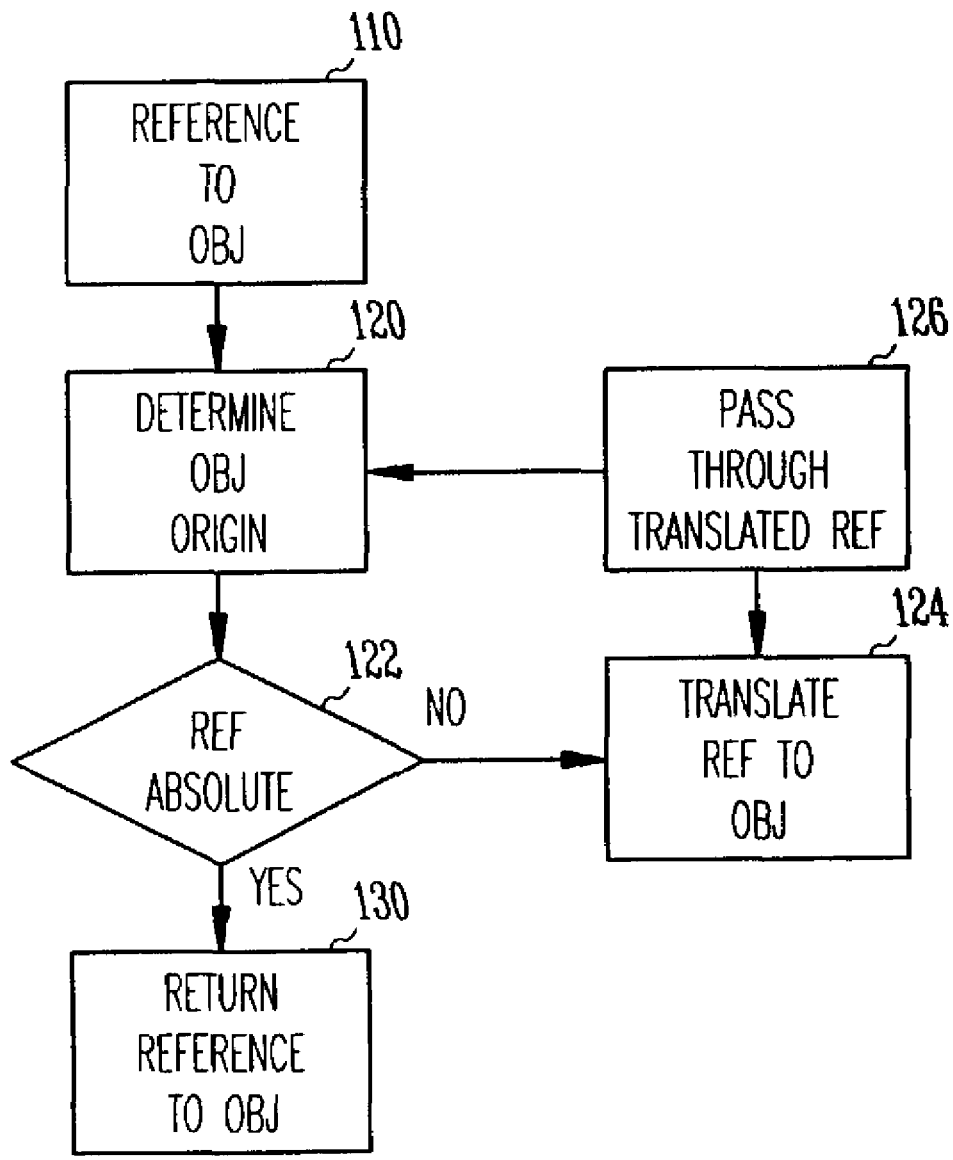
FIG. 1 shows one flowchart of a method providing access to a storage object according to the present invention.

In the following detailed description of various embodiments of the present invention, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed description which follows are presented in terms of algorithms and symbolic representations of operations on data bits within a computer memory. These algorithmic descriptions and representations are the ways used by those skilled in the data processing arts too most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Furthermore, as used herein a computing device includes one or more processing elements coupled with computer readable memory which can be volatile or nonvolatile memory or any combination thereof. Additionally, the term "object" of "storage object" as used herein includes data storage elements such as, and by way of example only electronic files, portions of data related to a single electronic file, a file system, a database, a storage device partition, and the like.

Initially in some embodiments, a logical representation of a storage object within its native storage environment is obtained with one or more APIs providing efficient access to the storage object provided to interface with the storage object. One such logical representation in one embodiment, is achieved by mapping the structure of the storage object, within the storage environment. This mapping populates a predefined data structure. The data structure is manipulated as appropriate by the APIs which retain knowledge about the format and structure of the predefined data structure. However, any user-defined application or client module using the API need not know the format or structure of the predefined data structure.

Of course as will be readily apparent to those skilled in the art, the mapping need not be a single data structure or any data structure at all since any rules-based application, which normalizes the mapping of the storage object, is acceptable when the API has access to the appropriate rules to interface with the normalized mapping.

For example, in some embodiments an initial reference to a data storage object occurs within the same storage environment wherein the object physically resides or within a different storage environment which is interfaced through a network connection to the object's physical storage environment, such as a SAN. The reference triggers a pointer to the object to be opened and set initially to null. Next, a map domain request is initiated with the storage object's physical storage environment. The map domain request, in some embodiments, is implemented as a set of executable instructions operable to access low level operating system tables and executable instructions. Further, the map domain request generates a data structure which serves as a map to the structure and makeup of the storage object.

In some embodiments, the data structure is a tree having a root node which identifies the storage object being mapped. The second level of the tree includes an identification of the file system located on the storage object's physical storage environment. A third level of the tree identifies the volume manager associated with routing references to the storage object to an appropriate disk partition or disk drive. Next, the partitions of the disk are identified within the tree. Finally one or more disks are identified as leaf nodes of the tree, these leaves identify the exact physical storage device or devices within which the storage object being referenced physically resides.

Of course as will be readily appreciated by those skilled in the art, a tree need not be used as the data structure representing the map of the data storage object within the data storage object's physical storage environment, since any data structure now known (e.g., lists, linked lists, arrays, hash tables, heaps, binary trees, treaps, arrays, customized classes in objected oriented languages, and the like) or hereafter developed can be deployed without departing from the present invention. Furthermore, as previously presented no data structures are required at all if a rules-based normalization process is used to generate a logical map.

Next in some embodiments, the extents of the object are resolved. An initial extent identifies the name and size of a logical storage object. A number of additional extents identify device's offset and size (length) that, together, describe the physical storage associated with the storage object. Corresponding as one skilled in the art will appreciate, having the generated data structure combined with the extents, an object is readily accessible and referenced from the referencing storage environment, even when the referencing storage environment includes a first file system which is incompatible with a second file system residing on the data storage object's physical storage environment.

In this way, in some embodiments, any user-defined application or client module becomes enabled to interface with a data storage object residing on a disparate operating system, if access to the map and information about how to retrieve nodes of the map are known to the user-defined application or client module. For example an application residing within MICROSOFT'S NT operating system can access and interface with a data storage object residing on a storage device controlled by a UNIX operating system.

Of course it is often desirable and advantageous to mask the details about the map from any user-defined application or client-module, by producing an intermediate set of interfaces referred to as an API. In this way, when the map's underlying representation is altered only a few modules within the API will need to be adjusted to account for the altered map representation, and the innumerable user-defined applications or client modules do not need modified at all, since these applications or modules do not include the details of the underlying representation of the map. In fact as one skilled in the art will appreciate, when the API is embodied as a dynamic linked library (DLL) or a shared library the user-defined application or client module will not even be required to recompile the modified API, since the appropriate modified API source code is compiled separate from the user-defined application of client module source code and dynamically linked with the user-defined application or client module during execution.

Furthermore, in some embodiments every storage object residing in a second storage environment is recursively mapped within the second storage environment as depicted. Accordingly, a complete map (e.g., data structure) of a second storage environment is created. The original referencing storage environment then receives a handle resulting in a direct communication link to each referenced object within the second storage environment by having access to the map (e.g., data structure).

Moreover in some embodiments, each storage object mapped receives a configuration identification which is used each time the referencing storage environment attempts to access the storage object. If the storage object's physical storage location is altered or modified in anyway, this identification notifies the referencing storage environment of the change and an updating map domain request is issued either automatically or manually from any referencing application residing in the referencing storage environment. Accordingly, the storage object's logical representation within the referencing storage environment is validated and/or modified as necessary. This results in a stable and persistent view of the storage object's physical storage environment.

In other embodiments, metadata associated with the data storage object are retrieved and returned to a referencing application in the referencing storage environment. The metadata in some embodiments are returned independent from the data structure, and in other embodiments the metadata are returned with the data structure such that each node within the data structure includes metadata related to the node. In this way, valuable information regarding a disparate file system is obtainable in the referencing storage environment, such as naming conventions, data blocking factor, partitions, and the like. Further, metadata includes any non primary data (e.g., data not physically included within the data storage object's physical location) related to the storage object, such as modification date, security access level, byte size, data type (e.g., text, word processor, image, video, and the like), statistical data (e.g., number of accesses, changes made to the data, and the like) and others.

Also, in some embodiments low-level executable instructions provide the exact unique location of the data storage object's storage device. In some embodiments, this resolution includes a serial number of the device, in other embodiments it is an Internet Protocol (IP) address. This private information provides additional detail to the generated data structure, not normally ascertainable by a file system or operating system.

In still other embodiments, sets of executable instructions permit the virtual mounting of a foreign and remote file system onto a local file system by using the map domain and the metadata to emulate the foreign file system. In this way, and by way of example only, a WINDOW'S NT file system can mount a Unix file system.

As one skilled in the art will readily appreciate, the logical representation of the storage object, acquisition of the metadata, and the exact location of storage devices housing the storage object is best provided to a user-defined application or a client module through a set of modules comprised in an API, since this provides transparent access to the user-defined application or client module, as presented above.

Moreover, production of the logical representation of the storage object entails adequate communication and traversal of the storage object's storage management stack within the storage object's storage environment. In some embodiments, the storage management stack includes a primary group of services provided by an operating system managing the storage object's storage environment. These services manage the relationship between user-defined applications and disk resources, and are further oriented toward managing disk resources and transferring data associated with storage objects between volatile and non volatile memory (RAM, cache, or disk) on behalf of the user-defined applications. No single service within an operating system performs all the necessary data services, and conventionally these services are arranged in a hierarchy called a storage management stack.

Each level of the storage management stack is responsible for specific storage level abstraction. At the lowest level or bottom of the stack, device drivers present a uniform set of interfaces that are responsible for converting Input/Output (I/O) requests into device-specific requests. Typically, above the lowest level of the stack a volume manager level is present, volume managers (VMs) group storage devices into logical groupings referred to as volumes. The manner of grouping disks can vary. Disks may be serially concatenated or arranged in a more complex configuration to support striping or RAID technology. VMs decompose I/O requests and determine the source and destination of data based on how the volume is configured.

File systems often appear above the VM within a storage management stack. File systems build a structure on top of the disk space associated with a volume, the structure is referred to as a file system. The file system allows user-defined applications to claim and use segments of disk storage, generally referred to as files. Applications access data within a file as a series of byte streams, the file systems translate the byte streams to data blocks located on volumes, the VM's translate the data blocks to data blocks on specific storage devices, and finally the device drivers convert the data blocks to I/O device specific requests.

As one skilled in the art will appreciate, each layer of the storage management stack is responsible for hiding some level of complexity from the layer above. Moreover, each element of the stack is responsible for exporting its abstraction to the layer above it within the stack. Accordingly, the storage management stack and the elements of the stack include a number of operating system and file system services which permit the abstraction and translations to occur.

To decompose a storage object within a storage management stack, the storage object reference must be translated into one or more absolute extents from the initial reference which is often at different stack abstraction level and is typically associated with one or more relative extents for the storage object. For example, some applications may reference a storage object without the need for a file system, and some file systems do not include a VM. A storage object is definable by using extents, wherein each extent identifies a storage management stack level, a beginning location within the identified stack level, and a data length associated with the extent. Furthermore, a single storage object can include several non contiguous extents which when assembled describe all the data associated with a storage object.

As services are used within the storage management stack, relative extents are translated into additional relative extents until at the lowest level, device extents or absolute extents are acquired. The absolute extents provide the exact physical locations for the one or more storage devices which house the storage object. The process of traversing the stack is referred to herein as "mapping through the stack."

By way of example only, consider an application referencing a file (e.g., storage object) identified by the string "fs1/foo" residing on a file system identified as the substring "fs1." An application reference to file foo would identify a top storage management stack reference to the file foo with the following string: "/fs1/foo." The reference would further include file length information with respect to the file, so that a complete file system relative extent for file foo made by the application would be translated to "/fs1/foo,0,n" where $0$ identifies the starting address for foo and n is the length of foo in bytes.

With the extent of foo for the file system resolved, foo's file system processes the file system extent into a VM extent which is handled by the next level of the storage management stack, the VM. The file system, in the present example, translates the file relative extent "/fs1/foo,x,n" to a volume relative extent of (v1,0,n) where v1 is the volume housing foo, $0$ is the starting block for foo within the volume, and n is the number of required blocks. Of course it is readily apparent that any number of volume relative extents can be required by a single file reference, and although the present example includes a single volume extent, any number of extents can be derived. Moreover, the actual starting block within the volume can be at any block location, and although the present example has a starting block of $0$, this is not a requirement. At this point, the volume relative extent is processed into device extents by the VM such that:

$(v1,0,n)=(dev1,0,i), (dev2,0,j), (dev3,0,k)$ where v1 is a simple concatenated set of disks and where i, j, and k are the capacities of devices dev1, dev2, and dev3, respectively. In the present example, i+j+k=n.

If v1 is a striped volume with a stripe unit size of 2 and a width of 3, mapping through the v1 to produce device extents would produce:

$(v1,0,n)=(dev1,0,2), (dev2,0,2), (dev3,0,2), (dev1,2, 2), (dev2,2,2), (dev3,2,2), (dev1,4,2), (dev2,4,2), (dev3,4,2) \ldots (dev1,((n/3)-2), 2), (dev2,((n/3)-2),2), (dev3,((n/3)-2),2)$ where the stripe unit size is the number of blocks written to each member of a striped set of disks. However, if v1 is mirrored to two devices, dev1 and dev2, then mapping through the v1 could yield:

$(v1,0,n)=(dev1,0,n)$ and $(dev2,0,n)$.

Of course as explained above, there is no requirement that the extents of dev1, dev2, and dev3 begin at block $0$ within the devices, and this is presented for purposes of illustration only with the present example.

As one skilled in the art will appreciate, some storage management stacks can include partitions requiring a mapping through the partition, and in other embodiments no volume manager is present at all in the storage management stack. Moreover, the translation from one storage stack relative reference to a storage object to a next storage stack reference is often achieved with file system or operating system provided operations, not normally used or accessible directly to a user-defined application. However, not all operating systems or file systems make translation operations available, and correspondingly in those situations translation modules are customized to perform the appropriate translation for each non providing file system or operating system.

FIG. 1 shows one flowchart of one method 100 providing access to a storage object according to the present invention. Initially, in step 110 a reference to a storage object is received. Receipt of the reference can come from a variety of sources including a user-defined application (e.g., client module), a plug-in service module provided at one or more levels within a storage management stack housing the physical location of the storage object, a plug-in module provided to interface a client module and one or more modules of an API library to the storage object, an operating system or file system plug-in module, and the like.

In step 120, the origin within the storage management stack of the reference is determined. For example, the reference is determined to be a storage object reference directed to a specific level within the storage management stack, such as a volume relative extent reference or a device extent reference. Next, a check is made to determine if the reference is an absolute reference in step 122. An absolute reference need not be translated further within the storage management stack and is used to provide direct access to the storage object. If the reference is an absolute reference (e.g., one or more absolute extents) then the reference is returned in step 130. In some embodiments, the returned absolute reference is passed back up through the storage management stack, and each of the translated references along the way are assembled to form an indirect access to the storage object. The entire logical representation is then provided for use to an API library or to an initial referencing application for future use when accessing the storage object. In other embodiments, the reference is returned directly to the API library or the initial referencing application as a pointer.

If the reference is not an absolute reference, than the reference is translated into another reference operable to be processed by the next stack level within the storage management stack in step 124. The translated reference is then passed through the stack to the next stack level in step 126 for processing to again resume in step 120. Processing proceeds until an absolute reference is detected and passed to step 130. As the initially received reference is translated from relative extents to one or more absolute extents, each translation combines to form a logical map within the storage environment to the storage object, and communication of this map permits applications to access the storage object from disparate storage environments. In some embodiments, the map is formed by a separate distinct processes initiated indirectly and transparently provided through interaction with the API library.

Figure 2:
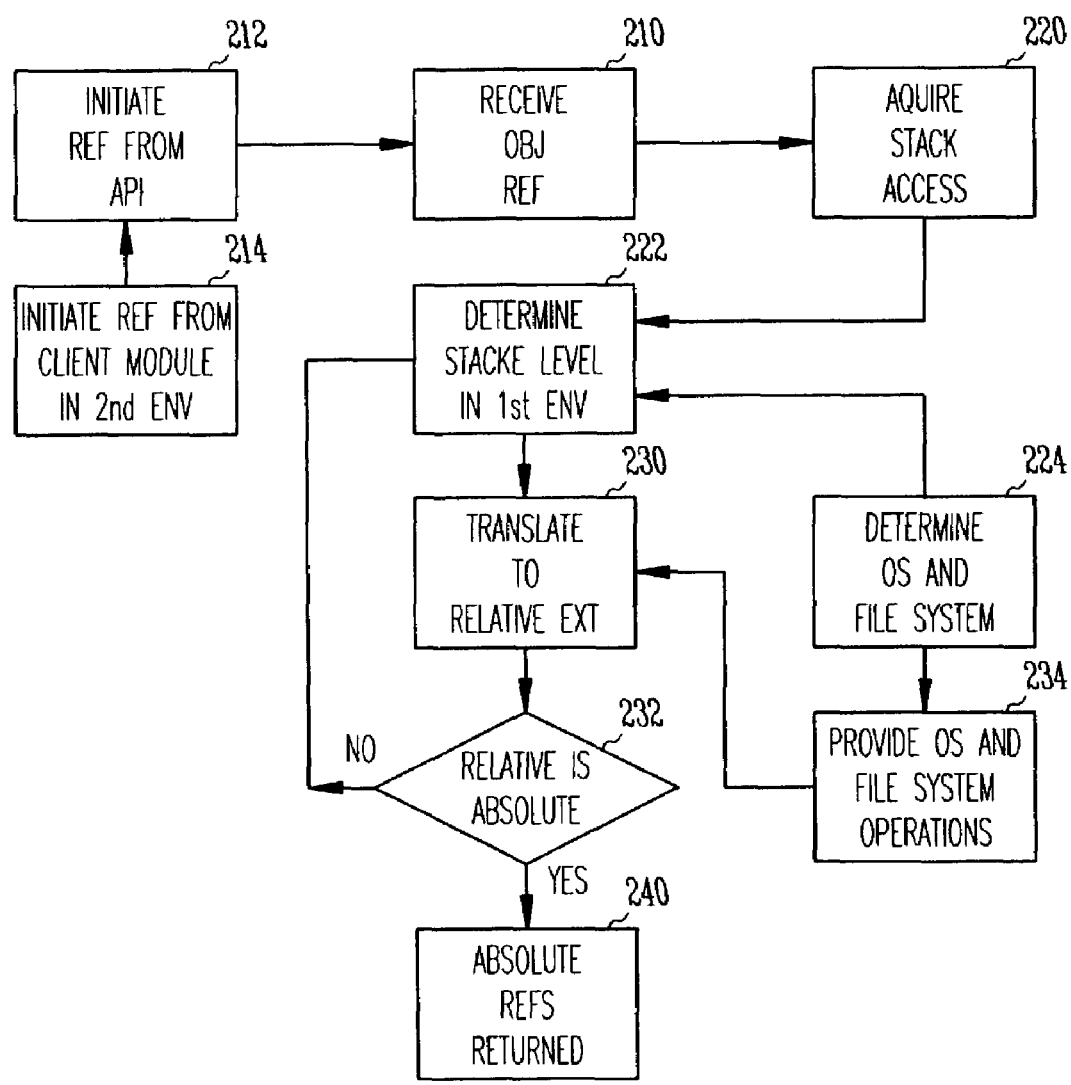
FIG. 2 shows one flowchart of a method to resolve an absolute reference to a storage object according to the present invention.

FIG. 2 shows one flowchart of one method 200 to resolve an absolute reference to a storage object according to the present invention. In step 210 a storage object reference is received. In some embodiments, the reference is received from one or more modules associated with an API library as depicted in step 212. Furthermore, the API library in some embodiments include one or more plug-in modules which combine to perform the steps of method 200. The API library includes storage-access modules permitting a client module, residing in a second storage environment that is separate and distinct from a first storage environment housing the storage object, to initiate the storage object reference in step 214.

In step 220 access to a storage management stack is acquired, wherein in step 222 an initial stack level associated with the storage reference is determined. As previously presented, once the initial stack level of the received reference is determined, a determination of the file system or VM of the first storage environment in step 224 will identify whether one or more file system or VM operations are available in step 234 to assist in translating the reference from one or more relative extent references into one or more subsequent relative extent references or one or more absolute extent references. If no file system or VM operations exist, customized operations are provided to facilitate the translation process within the first storage environment.

The reference is translated into a one or more relative extents in step 230, however if the reference is initially received as one or more absolute extent references then no translation need occur at all in step 230. A check is made in step 232 to determine if the reference is associated with relative extent references or absolute extent references. If the reference is one or more relative extent references then the stack level determination and reference translation steps 222 and 230 are iterated, until one or more absolute extent references are acquired for the storage reference.

As previously presented, the absolute extent references combine to identify the storage object's absolute location within the first storage environment. Once the absolute extent references are acquired for the storage object, the absolute extent references and/or all the translated relative extent references are returned in step 240. The references are returned, in some embodiments, to the proceeding stack level, to an API library, to a client module, and the like. In this way, any storage environment is mapped and access provided by organizing and making available one or more services to transparently and iteratively translate relative extents into absolute extents. One skilled in the art will appreciate that in addition to file systems and volume managers, other elements such as snapshot drivers, partition drivers, or disk drivers may participate in the extent resolution process.

Figure 3:
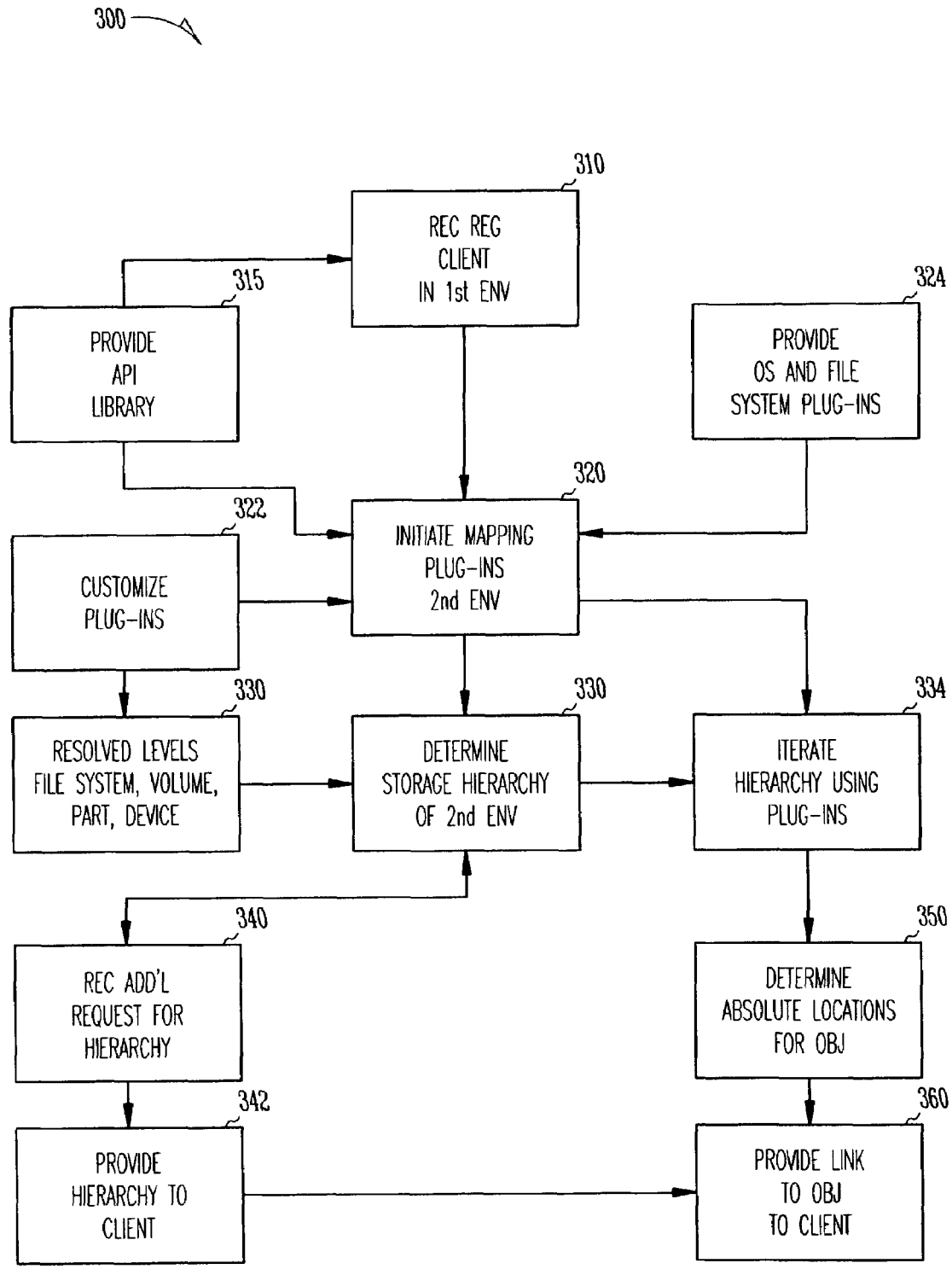
FIG. 3 shows one flowchart of another method to provide access to a storage object according to the present invention.

FIG. 3 shows one flowchart of another method 300 to provide access to a storage object according to the present invention. A request to access a storage object is received from a client module in a first storage environment in step 310. In some embodiments, receipt of the request from the client module occurs indirectly, such as through one or more API library modules provided in step 315. Also, in step 320 one or more mapping plug-in modules are initiated in a second storage environment, wherein the storage object physically resides in the second storage environment. Again in some embodiments, the mapping plug-in modules are provided in the API library, which also provides modules to the client module. As is apparent, the API library is operable to execute in both the first and second storage environments.

In other embodiments, the mapping plug-in modules are provided by a second operating system or a second file system associated with the second storage environment in step 324. In still other embodiments, the mapping plug-in modules are customized in step 322 to provide the translation capabilities to resolve relative references associated with the storage object and to traverse a storage hierarchy associated with the storage object in the second storage environment.

The mapping plug-in modules are used in step to determine the storage hierarchy of the second storage environment in step 330. The storage hierarchy, in some embodiments, include a file system level, a volume manager level, a partition level, and a device level as depicted in step 332. Furthermore, in step 334, one or more of the mapping plug-ins are used to iterate the hierarchy until one or more absolute locations associated with the storage object are determined in step 350. Finally, in step 360 a link to the storage object is provided to the client module to provide access to the storage object in the second storage environment when the client module resides in the first storage environment.

In some embodiments, the client module makes an additional request for the storage hierarchy in step 340, and the storage hierarchy is provided directly to the client module, thereby providing the linkage to the storage object as depicted in step 342. As one skilled in the art will appreciate, linkage from the absolute locations associated with the storage object in the second storage environment is achieved through a variety of techniques. In some embodiments, these techniques expose the details of the storage hierarchy to the client module and make them directly accessible, while in other embodiments the details of the storage hierarchy are obscured from the client module and embedded within API libraries such that the client module is capable of accessing the storage hierarchy without knowing the details of the hierarchy. In this way, different levels of abstraction are customized and provided to access a storage object with method 300 of FIG. 3.

Figure 4:
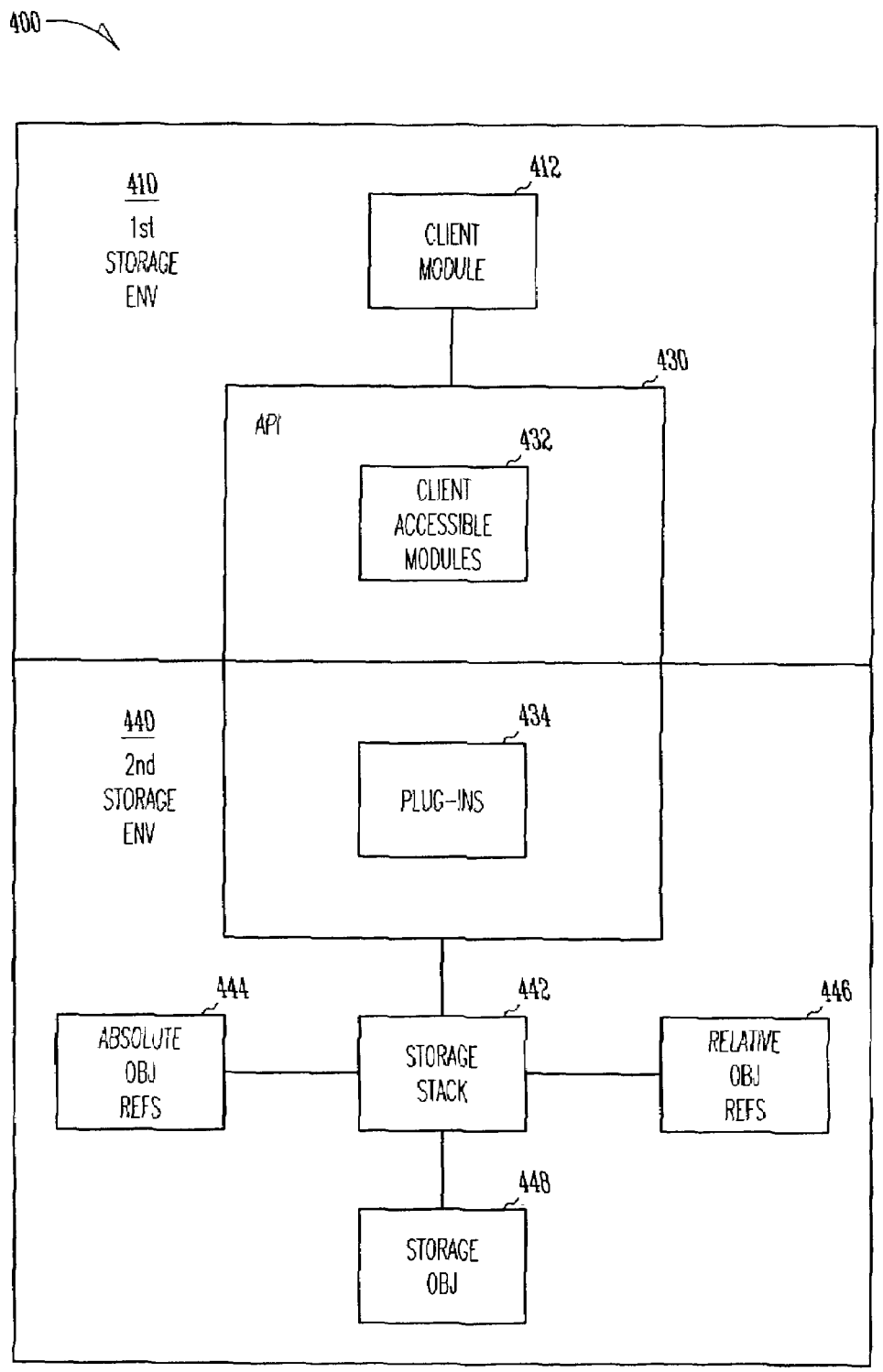
FIG. 4 shows one diagram of a storage object access system according to the present invention.

FIG. 4 shows one diagram of one storage object access system 400 according to the present invention. The system 400 includes an API library 430 having one or more client-accessible modules 432 and one or more plug-in modules 434. The system further includes a client module 412 that establishes an interaction with a storage object 448. The API library 430 includes client-accessible modules 432 residing and executing in a first storage environment 410, and the API library 430 includes plug-in modules 434 residing and executing in a second storage environment 440. The physical locations of the storage object 448 also reside in the second storage environment 440.

The client-accessible modules 432 allow a reference to the storage object 448 which is relative and occurs within the first storage environment 410. In some embodiments, the reference provides the interaction with the storage object 448 directly, such as when the reference is an absolute reference 448 to the storage object 448 in the second storage environment 440.

The plug-in modules 434 interface with the client accessible modules 432, in the second storage environment 440 by using the reference to grant access to one or more of the client-accessible modules 432 to the storage object 448. In some embodiments, the access is provided by the plug-in modules 434 by the construction of a logical storage map for the storage object 448 in the second storage environment 440.

The map is constructed by the plug-in modules 434 iterating through a storage management stack 442 using the initial reference to determine a current storage management stack level within the stack 442. During iteration through the stack 442, the plug-in modules 434 translate relative references associated with the initial provided reference to the storage object 440 into additional relative references 446 associated with the storage object 448 until one or more absolute references 444 are determined.

Furthermore, in some embodiments the plug-in modules 434 interface with one or more services provided by an operating system of the second storage environment 440. In this way, a file system or VM which provides the ability to translate references into relative references 446 and absolute references 444 is leveraged by the present invention and utilized. While customized plug-in modules 434 are developed, in other embodiments, when the file system or VM of the second storage environment 440 fails to provide services to access and iterate the storage management stack 442.

Figure 5:
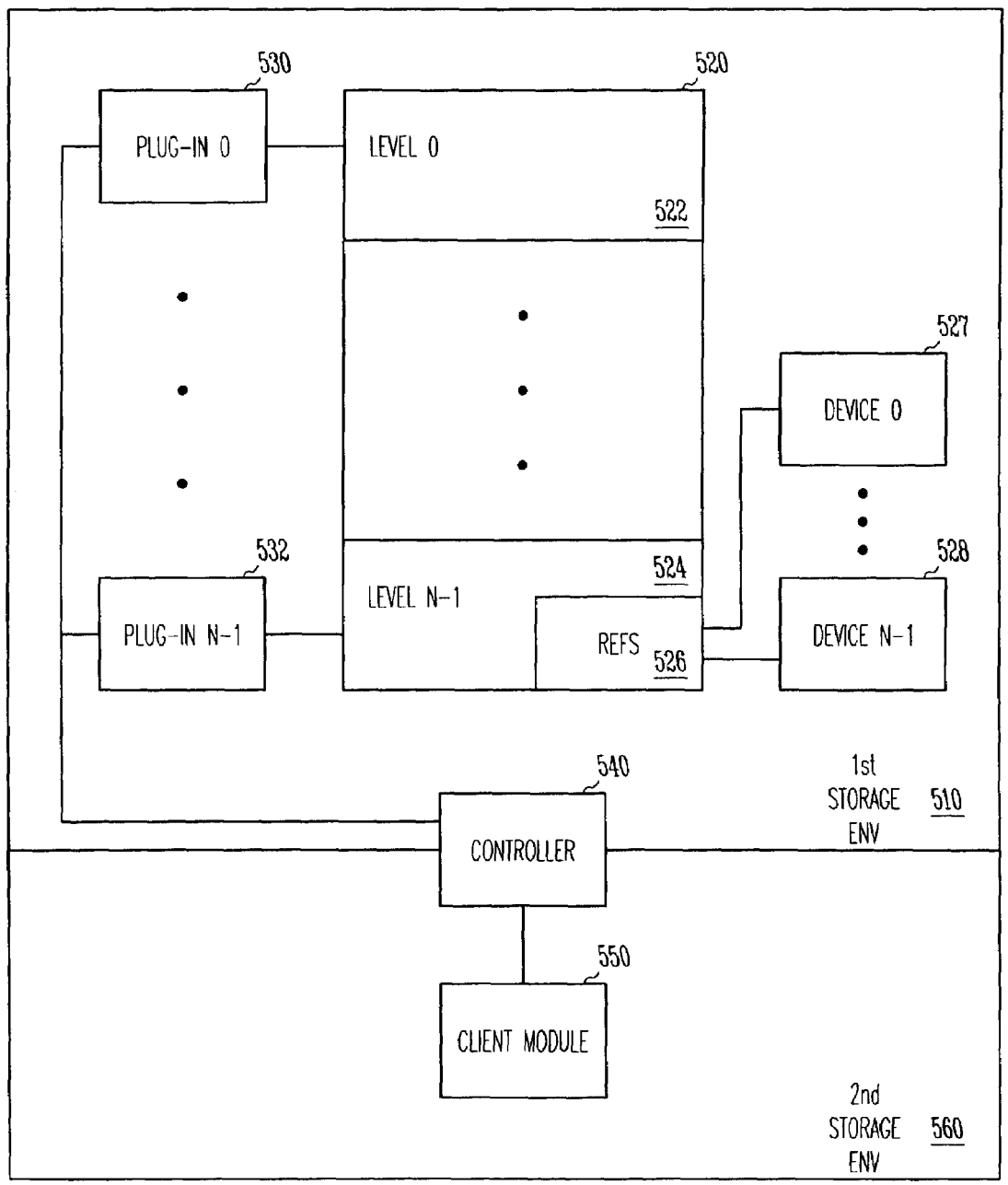
FIG. 5 shows one diagram of a storage access system according to the teachings of the present invention.

FIG. 5 shows one diagram of one storage access system 500 according to the teachings of the present invention. The system 500 includes a storage management stack 520 having a top level 520 through a lowest level 524, wherein the lowest level 524 identifies one or more storage devices 527–528 of a first storage environment 510. The system 500 also includes plug-in modules 530 through 532 and a controller 540.

Each plug-in module 530–532 interfaces with one of the stack levels 522–524 in order to resolve a reference to a storage object. In some embodiments, as a reference is resolved it is translated from the present stack 520 level's abstraction to the next lower stack 520 level's abstraction. When a translated reference is detected to be an absolute reference to the storage object housed on one or more of the storage devices 527–528, translation of the references and traversal through the stack 520 terminates normally.

The controller 540 selectively calls the plug-in modules 530–532 as needed and as the reference is translated through the stack 520, until the absolute reference is obtained. Moreover, in some embodiments the controller 540 is a set of executable instructions operable to iterate the stack 540 using the plug-in modules 530–532, while in other embodiments the controller 540 is a set of electro-mechanical devices operable to iterate the stack 540 using the plug-in modules 530–532. In still other embodiments, the controller 540 is provided as or within an API library. In still other embodiments, the controller 540 executes in both the first storage environment 510 and a second storage environment 560. Of course as one skilled in the art will appreciate, the controller 540 need not execute on both environments 510 or 560 since additional modules residing in either environment 510 or 560 could initiate executions of the plug-in modules 530–532 using different interfacing techniques, such as passing data or creating signal or semaphore files within one of the environments 510 or 560, wherein the additional modules detect the data or files and initiate the proper executions. In still more embodiments, the client module 550 interacts with the controller 540 in the second storage environment 560.

Additionally, in some embodiments, the stack 520 is a storage hierarchy representing a storage configuration for the storage object within the first storage environment 510. Further, the stack levels 530–532, in other embodiments, include an application level, a file system level, a volume manager level, and a device level. The device driver level is the lowest level 524, and in some embodiments references or pointers 526 provide a direct linkage to the storage devices 527–528 of the first storage environment 510.

In still more embodiments, one or more replica references are obtained by the controller 540 with the absolute references, wherein the replica references identify replicas associated with the storage object in the first storage environment 510. In this way, mirrored data associated with the storage object occurring on multiple storage devices within the first storage environment, are transparently interfaced to the client module 550, without the client module 550 being required to manage multiple references.

Although the above embodiments provide illustrations wherein a client module resides in a separate storage environment from the physical location of the storage object, one skilled in the art will appreciate that the present invention is not intended to be so limiting, since in some instances a client module acquires the storage management stack with the present invention and then uses the stack to provide a myriad of different accesses to the storage object with subsequent modules residing in the same storage environment as the storage object or different storage environments.

CONCLUSION

The methods and systems discussed above permit reliable and stable access to a storage object. These interfaces permit customized user-defined modules to access low-level private information about the storage object, even when the storage object resides in disparate storage environments, operating systems, and uses disparate file systems. Multiple levels of abstraction in the interfaces are resolved by plug-in modules which directly interface with a storage object's storage management stack to translate relative references to a storage object through the stack until one or more absolute references to the storage object is obtained. The plug-in modules are easily integrated into API libraries and leverage existing operating system or file system provided operations. In contrast to the past, one can now efficiently access and interface between disparate file systems, operating systems, storage environments, or computing environments. As one skilled in the art will appreciate, this is achieved with existing file systems, storage devices, and operating systems with no need for substantial revisions or adherence to any particular data communication standard.

Moreover, as will be apparent to those skilled in the art the present invention can be usefully deployed during the creation of a frozen image associated with the storage environment. In this way, data mirroring and data backup is more easily achieved with the tenets of the present invention by using the present invention to facilitate applications in creating frozen images of the storage environment.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method for resolving a storage object's absolute location within a first storage environment to grant access to the storage object, comprising:

receiving a request to access a storage object residing on a non-volatile storage device of the first storage environment;

receiving a storage object reference which corresponds to the storage object;

determining an initial storage management stack level associated with the storage object reference;

in response to determining the storage object reference is not an absolute reference, iterating through one or more additional storage management stack levels beginning with the initial stack level, wherein each storage management stack level identifies one or more relative extents of storage objects according to a different level of abstraction; and translating the storage object reference through each iteration into one or more level-specific relative extents at each storage management stack level until one or more absolute extents are obtained, wherein the one or more absolute extents comprise the storage object's absolute location within the first storage environment.

2. The method of claim 1, wherein in receiving the storage object reference, the reference is received from a module included in an application programming interface (API) library.

3. The method of claim 2, wherein in receiving the storage object reference, the reference is obtained from a client module initiating one or more storage-access modules of the API library resulting in the initiation of the module.

4. The method of claim 3, wherein in receiving the storage object reference, the client module resides in a second storage environment.

5. The method of claim 1, wherein in determining the initial storage management stack level, a file system and volume manager associated with the first storage environment is identified.

6. The method of claim 5, wherein in translating the storage reference, the file system and volume manager provide one or more operations to translate the storage reference into one or more of the relative extents and one or more of the absolute extents.

7. The method of claim 1, wherein the method is provided as one or more modules within an API library.

8. A storage object access system, comprising:
 a storage management stack having a plurality of stack levels, wherein the stack levels include a lowest level identifying one or more storage devices of a first storage environment;
 plug-in modules wherein each plug-in module interfaces with a different one of the stack levels to resolve a reference to a storage object and to pass the resolved reference to a next stack level, unless the resolved reference is an absolute reference to the storage object housed on one or more of the storage devices, wherein each plug-in module resolves references to storage objects according to a different level of abstraction; and
 a controller that selectively calls a number of the plug-in modules until the absolute reference is obtained.

9. The system of claim 8, wherein one or more replica references are obtained by the controller with the obtained absolute reference, the replica references identifying replicas for the storage object within the first storage environment.

10. The system of claim 8, wherein the controller is an application programming interface (API) library.

11. The system of claim 8, wherein the controller executes in both the first storage environment and a second storage environment.

12. The system of claim 8, wherein the controller is used by a client module in a second storage environment.

13. The system of claim 8, wherein the storage management stack is a storage hierarchy representing a storage configuration for the storage object within the first storage environment.

14. The system of claim 8, wherein the stack levels include an application level, a file system level, a volume manager level, and a device level.

15. The system of claim 14, wherein the device driver level is the lowest level.

* * * * *